US011879970B2

(12) United States Patent
Sakamaki et al.

(10) Patent No.: US 11,879,970 B2
(45) Date of Patent: Jan. 23, 2024

(54) SIGNAL PROCESSING APPARATUS AND SIGNAL PROCESSING METHOD

(71) Applicant: Mitsubishi Electric Corporation, Tokyo (JP)

(72) Inventors: Hiroshi Sakamaki, Tokyo (JP); Ikuya Kakimoto, Tokyo (JP); Tomoya Matsuda, Tokyo (JP); Takamichi Nakamizo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 325 days.

(21) Appl. No.: 17/267,020

(22) PCT Filed: Jun. 14, 2019

(86) PCT No.: PCT/JP2019/023664
§ 371 (c)(1),
(2) Date: Feb. 9, 2021

(87) PCT Pub. No.: WO2020/044733
PCT Pub. Date: Mar. 5, 2020

(65) Prior Publication Data
US 2021/0239830 A1    Aug. 5, 2021

(30) Foreign Application Priority Data
Aug. 29, 2018   (JP) ................ 2018-160196

(51) Int. Cl.
*G01S 13/95*   (2006.01)
*G01S 13/53*   (2006.01)
*G01W 1/10*   (2006.01)

(52) U.S. Cl.
CPC ............. *G01S 13/95* (2013.01); *G01S 13/53* (2013.01); *G01W 1/10* (2013.01)

(58) Field of Classification Search
CPC .......... G01S 13/95; G01S 13/53; G01S 13/18; G01S 13/582; G01S 13/5248; G01W 1/10; Y02A 90/10
See application file for complete search history.

(56) References Cited

U.S. PATENT DOCUMENTS 9,869,766 B1 * 1/2018 Breiholz ............... G01S 7/0003
2016/0252614 A1 * 9/2016 Takechi .................. G01S 13/95

FOREIGN PATENT DOCUMENTS

JP    2011-112373 A    6/2011
JP    2011112373 A  *  6/2011
(Continued)

OTHER PUBLICATIONS

International Search Report and Written Opinion dated Aug. 20, 2019, received for PCT Application PCT/JP2019/023664, Filed on Jun. 14, 2019, 14 pages including English Translation.
(Continued)

*Primary Examiner* — Catherine T. Rastovski
*Assistant Examiner* — Lal C Mang
(74) *Attorney, Agent, or Firm* — XSENSUS LLP (57) ABSTRACT

Based on a reception signal of a reflected wave of pulsed undulation repeatedly transmitted into a space, a Doppler spectrum derived from the reception signal, and a topographic-echo-removed spectrum resulting from removal of a topographic echo from the Doppler spectrum, a first weather echo region is found by using a weather parameter among weather parameters that is different in behavior between a weather echo and the topographic echo, and a second weather echo region is found by using a weather parameter among the weather parameters a behavior of which is not dependent on a Doppler velocity. The weather echo region is determined based on the first weather echo region and the second weather echo region. A signal processing apparatus and a signal processing method with which a zero-Doppler
(Continued)

weather echo attenuated, that is, erroneously suppressed, by topographic echo removal processing is readily reconstructed are thus obtained.

20 Claims, 8 Drawing Sheets

(56) References Cited

FOREIGN PATENT DOCUMENTS

| JP | 2017-67504 A | 4/2017 |
|----|---|---|
| WO | 2009/045618 A2 | 4/2009 |
| WO | WO-2020170690 A1 * | 8/2020 |

OTHER PUBLICATIONS

Hubbert et al., "Weather Radar Ground Clutter. Part II: Real-Time Identification and Filtering", American Meteorological Society, Jul. 2009, pp. 1181-1197.

Ryzhkov et al., "Polarimetric Rainfall Estimation in the Presence of Anomalous Propagation", Journal of Atmospheric and Osceanic Technology, vol. 15, No. 6, Dec. 1, 1998, pp. 1320-1330.

Notice of Reasons for Refusal dated Jan. 7, 2020, received for JP Application 2019-565569, 16 pages including English Translation.

* cited by examiner

example of membership function (c)

$Sc \geq thC1$ AND $Sw < thW2 \Rightarrow A$ $thC1 > Sc \geq thC2$ AND
$thW1 > Sw \geq thW2 \Rightarrow B+C$ $Sc < thC2$ AND $Sw \geq thW1 \Rightarrow D$ otherwise $\Rightarrow E$ ($thC1 > thC2$, $thW1 > thW2$)

SIGNAL PROCESSING APPARATUS AND SIGNAL PROCESSING METHOD

CROSS-REFERENCE TO RELATED APPLICATIONS

The present application is based on PCT filing PCT/JP2019/023664, filed Jun. 14, 2019, which claims priority to JP 2018-160196, filed Aug. 29, 2018, the entire contents of each are incorporated herein by reference.

TECHNICAL FIELD

The present invention relates to a signal processing apparatus and a signal processing method with which an attenuated zero-Doppler weather echo can readily be reconstructed.

BACKGROUND ART

An observation apparatus (a measurement apparatus) using undulation such as electromagnetic waves or sound waves has conventionally been available as an apparatus that measures a distance to and a velocity of a target or an object that is remotely located and accurately measures a target object by removing unnecessary waves. For such an observation apparatus (a measurement apparatus), a pulse Doppler technique using a radar apparatus, a lidar (lightwave radar) apparatus, or a sodar (sonic radar) apparatus has been known. According to some pulse Doppler techniques, an echo outside a basic sweep cycle (outside a distance measurement range) is used or removed. The pulse Doppler technique is used also for an observation apparatus (a measurement apparatus) such as a weather radar apparatus directed to precipitation particles (raindrops). Though description will be given hereinafter with reference to a weather radar apparatus (in particular, a pulse Doppler radar apparatus) by way of example of the observation apparatus, application of the signal processing apparatus and the signal processing method according to the present application is not limited to application to the weather radar apparatus that uses electromagnetic waves, and they can be applied to an observation apparatus that observes weathers.

The weather radar apparatus has been known as an apparatus that measures a position, strength (electric power), a Doppler velocity, or a spectral width of an object by emitting pulsed electromagnetic waves into a space, receiving reflected waves scattered by weather particles (precipitation particles) that are targets in the space, and processing reception signals. There is a demand on weather radar for high-speed and high-density measurement in a three-dimensional space. When measurement is conducted at an angle of elevation close to a horizontal, however, a topographic echo (which is also called ground clutter) which is reflection from the ground, mountains, or buildings is received more or less. When an angle of elevation at which measurement is conducted is large to some extent as well, a topographic echo at a short distance may be captured due to a side lobe of a beam.

Thus, in the weather radar apparatus, when an angle of elevation is large to some extent as well, a side lobe may be captured in topography at a short distance. When a topographic echo is introduced, two peaks originating from topography and precipitation appear in a Doppler spectrum. The topographic echo not only shifts a Doppler velocity of precipitation (a weather echo) apparently in a zero direction but also generally has protruding electric power and hence it also causes overassessment of strength (electric power), that is, rainfall strength. Therefore, the topographic echo should be removed. Processing for removing a topographic echo is generally called moving target indicator (MTI).

An approach to removal using a low-frequency filter for a time-series phase difference signal by making use of such a property of a signal of a topographic echo that a Doppler velocity is concentrated in a low frequency region around zero is available as the MTI approach. Alternatively, an approach to recovery of a weather echo around a Doppler velocity of 0 suppressed together with a topographic echo by removing a section around the Doppler velocity of 0 on a Doppler spectrum and interpolating the removed section with signals around the same has generally been known.

MTI applied to all range cells may attenuate also a weather echo to some extent. In order to address such a case, an approach to application of MTI only to a position of a topographic echo with the use of a map called a clutter map in which a position (range cell) of a topographic echo is recorded in advance is available. An approach (see, for example, PTL 1) by determining which of an identified point and a non-identified point a point falls under and using a correction value is also available. The clutter map or the identified point, however, is able to address only a topographic echo invariable in position resulting from normal radio wave propagation, and the clutter map or the identified point is unable to address a topographic echo caused by abnormal propagation that is varied in position of appearance depending on an atmospheric condition called anomalous propagation (AP) clutter.

A scheme (see, for example, NPL 1) using such a property that a topographic echo is greater in spatial variability (which is called a texture) of reception strength than a weather echo or a property that a signal of a topographic echo is larger in phase build-up (variation) than a weather echo is available as an approach that is also able to address AP clutter. In this approach, whether or not a range cell of interest for each observation contains a topographic echo is determined, and attenuation of a weather echo is mitigated by applying MTI only when the range cell contains the topographic echo. With such a method of determining whether or not to dynamically apply MTI as well, when a weather echo has a Doppler velocity around zero similarly to a topographic echo and has a narrow spectral width (which is called zero-Isodop), the weather echo may erroneously be suppressed.

An approach (see, for example, PTL 2) to suppression of attenuation of a weather echo in a region where Doppler velocities observed at two different time points are around zero (which is referred to as a zero-Doppler region below) by identifying the zero-Doppler region based on motion over time of the zero-Doppler region is available as an approach to avoidance of erroneous suppression when a weather echo has a Doppler velocity around zero similarly to a topographic echo and has a narrow spectral width.

CITATION LIST

Patent Literature

PTL 1: Japanese Patent Laying-Open No. 2017-67504
PTL 2: Japanese Patent Laying-Open No. 2011-112373

Non Patent Literature

NPL 1: J. C. Hubbert, M. Dixon, and S. M. Ellis, Weather Radar Ground Clutter. Part II: Real-Time Identification and Filtering, J. Atmos. Oceanic Technol., 26, 1181-1197, 2009.

SUMMARY OF INVENTION

Technical Problem

The method disclosed in PTL 2, however, is disadvantageous in that it is unable to identify a zero-Doppler region unless there is variation of the zero-Doppler region between two time points and zero Doppler attenuates in topographic echo removal processing.

The present invention was made to solve problems as above, and relates to a signal processing apparatus and a signal processing method with which a zero-Doppler weather echo attenuated by topographic echo removal processing is readily reconstructed.

Solution to Problem

According to a signal processing apparatus and a signal processing method according to the present invention, based on a reception signal of a reflected wave of pulsed undulation repeatedly transmitted into a space, a Doppler spectrum derived from the reception signal, and a topographic-echo-removed spectrum resulting from removal of a topographic echo from the Doppler spectrum, a first weather echo region is found by using a weather parameter among weather parameters that is different in behavior between a weather echo and the topographic echo and a second weather echo region is found by using a weather parameter among the weather parameters a behavior of which is not dependent on a Doppler velocity, or a weather echo region where a Doppler velocity is zero is found based on the weather parameter. A weather echo region is determined based on the first weather echo region and the second weather echo region or based on the first weather echo region and the weather echo region where the Doppler velocity is zero.

Advantageous Effects of Invention

As set forth above, according to the present invention, a signal processing apparatus and a signal processing method with which a zero-Doppler weather echo that is attenuated, that is, erroneously suppressed, by topographic echo removal processing is readily reconstructed, that is, prevented from being erroneously suppressed, by using characteristics of a weather parameter to determine a weather echo region can be obtained.

DESCRIPTION OF EMBODIMENTS

First Embodiment

Figure 1:
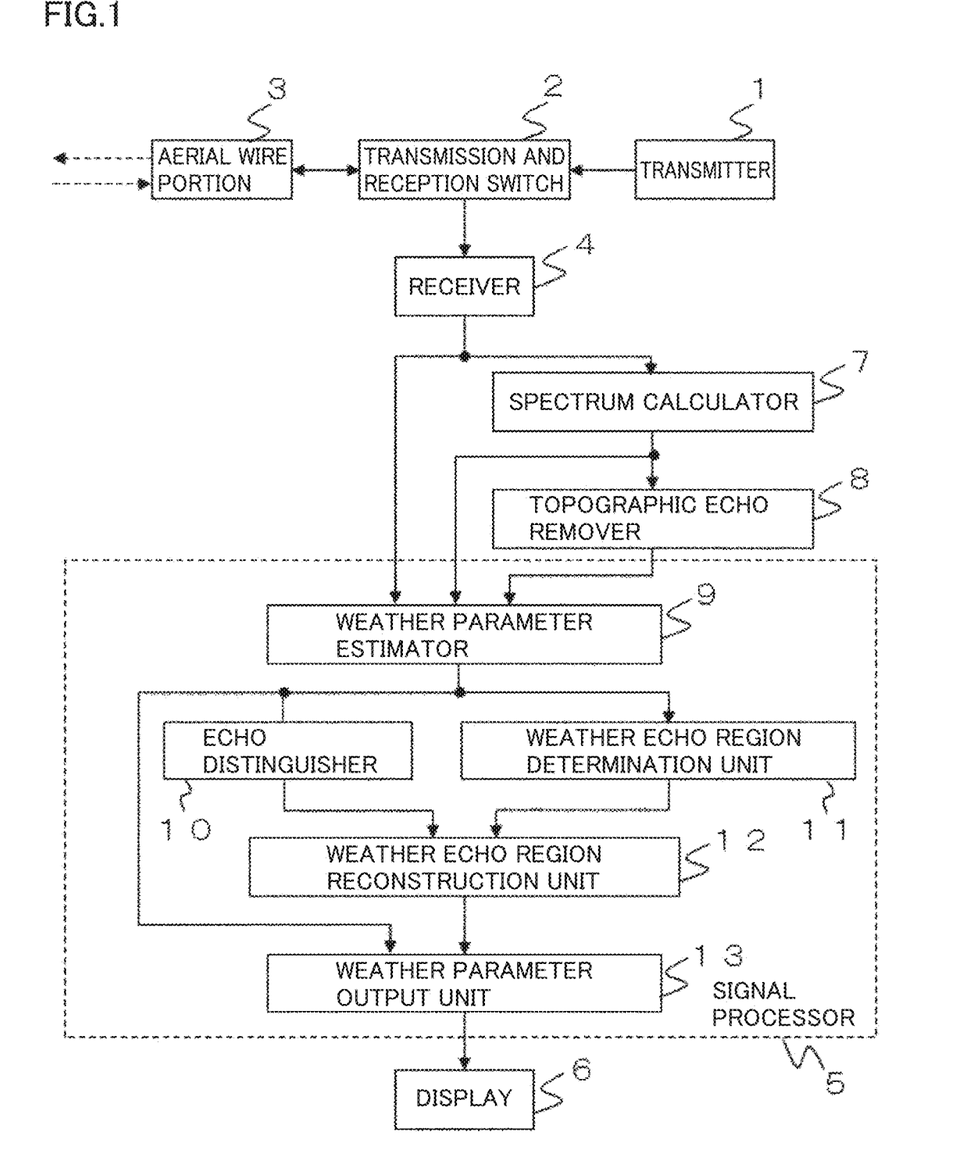
FIG. 1 is a functional block diagram of a signal processing apparatus according to first and second embodiments of the present invention.

A signal processing apparatus and a signal processing method according to a first embodiment of the present invention will be described below with reference to FIGS. 1 to 4. In particular, the signal processing method according to the first embodiment will be described with reference to FIG. 3. FIG. 1 is a functional block diagram of a weather radar apparatus (an observation apparatus or a measurement apparatus) to which the signal processing apparatus according to the first embodiment is applied. The present application can be carried out also according to a configuration of a functional block different from that in FIG. 1. In other words, the configuration shown in FIG. 1 is an exemplary block configuration. The same or corresponding elements in the drawings of the present application have the same reference characters allotted and detailed description thereof may not be provided.

In FIG. 1, a weather radar apparatus to which the signal processing apparatus according to the first embodiment is applied includes a transmitter 1, a transmission and reception switch 2, an aerial wire portion 3 (an antenna portion 3), a receiver 4, and a signal processor 5 (signal processor 5 corresponding to the signal processing apparatus according to the present application). These can be defined as the weather radar apparatus according to the first embodiment. In other words, the observation apparatus (measurement apparatus) according to the first embodiment can be defined as including transmitter 1, transmission and reception switch 2, aerial wire portion 3 (antenna portion 3) or an optical scanner 3 or a sound wave speaker 3, receiver 4, and signal processor 5 (the signal processing apparatus according to the present application). Aerial wire portion 3 (antenna portion 3) or optical scanner 3 or sound wave speaker 3 can be defined as an undulation emitter and accepter 3. Such undulation emitter and accepter 3 may be constituted of a transmitter and a receiver separate from each other.

In FIG. 1, transmitter 1 generates a reference signal on which transmission waves are based and subjects the reference signal to pulse modulation, such phase modulation as varying an initial phase each time of transmission, frequency conversion, or amplification. Transmission and reception switch 2 outputs pulsed undulation which is transmission waves generated in transmitter 1 to aerial wire portion 3 and takes in reception waves from aerial wire portion 3. Aerial wire portion 3 radiates pulsed undulation as transmission waves into a space and obtains as reception waves (reflected waves), incoming radio waves (reflected undulation) as a result of reflection by an object present in the space.

Receiver 4 takes in reception waves received at aerial wire portion 3 and passing through transmission and reception switch 2 and subjects the reception waves to frequency conversion and amplification. Thereafter, receiver 4 demodulates the reception waves, generates a reception signal (a reception signal of a reflected wave of pulsed undulation), and sends the reception signal to signal processor 5.

In FIG. 1, signal processing apparatus 5 is the signal processing apparatus according to the first embodiment. Signal processing apparatus 5 includes a spectrum calculator 7, a topographic echo remover 8, a weather parameter estimator 9, an echo distinguisher 10, a weather echo region determination unit 11 (an echo region determination unit 11), a weather echo region reconstruction unit 12, and a weather parameter output unit 13. Spectrum calculator 7 and topographic echo remover 8 may be provided outside signal processing apparatus 5 as illustrated in FIG. 1. Display 6 is a display apparatus such as a liquid crystal display that shows a weather parameter in a range cell that corresponds to a weather echo region and is provided from signal processing apparatus 5 (weather parameter output unit 13) (determined by weather echo region reconstruction unit 12) with a predetermined method. Display 6 may show a weather parameter provided from weather parameter estimator 9 with a predetermined method.

In FIG. 1, spectrum calculator 7 generates a Doppler spectrum by Fourier transform of a reception signal generated in receiver 4. Topographic echo remover 8 estimates and removes a topographic echo. Topographic echo remover 8 removes a signal around zero Doppler from the Doppler spectrum generated in spectrum calculator 7, thereafter performs topographic echo removal processing for interpolating a section around a removed point, and generates a Doppler spectrum from which the topographic echo has been removed. Specifically, topographic echo remover 8 estimates a topographic echo from a Doppler spectrum derived from a reception signal of a reflected wave of pulsed undulation. A spectrum distribution of the topographic echo is preferably estimated by fitting of the Doppler spectrum generated in spectrum calculator 7. Topographic echo remover 8 removes the Doppler spectrum included in the estimated spectrum distribution of the topographic echo.

In FIG. 1, weather parameter estimator 9 finds a weather parameter based on the reception signal of the reflected wave of pulsed undulation repeatedly transmitted into a space, a Doppler spectrum derived from the reception signal by spectrum calculator 7, and a topographic-echo-removed spectrum resulting from removal of the topographic echo from the Doppler spectrum by topographic echo remover 8. Specifically, processing for estimating a weather parameter such as a phase, signal strength (a radar reflective factor), or a difference in strength between before and after topographic echo removal based on the reception signal (time-series signal) generated in receiver 4, the Doppler spectrum generated in spectrum calculator 7, and the topographic-echo-removed Doppler spectrum generated by topographic echo remover 8 is performed.

In FIG. 1, an echo distinguisher 10 finds a first weather echo region based on a weather parameter among weather parameters that is different in behavior between a weather echo and a topographic echo. Specifically, processing for determining whether a signal in each range cell is a weather echo, a topographic echo, mixture of both of them, noise other than the former, or an undeterminable signal based on the weather parameter generated in weather parameter estimator 9 is performed. Weather echo region determination unit 11 (echo region determination unit 11) finds a second weather echo region based on a weather parameter among the weather parameters a behavior of which is not dependent on a Doppler velocity. Specifically, processing for determining whether or not a signal in each range cell contains a weather echo based on a weather parameter that is not varied by a value of a Doppler velocity, among the weather parameters generated in weather parameter estimator 9, is performed.

In FIG. 1, a weather echo region reconstruction unit 12 determines a final weather echo region based on the first weather echo region and the second weather echo region. Specifically, processing for reconstructing a weather echo region based on a region (the first weather echo region) determined as the weather echo and the weather echo region (the second weather echo region) generated in weather echo region determination unit 11, out of results of echo distinction generated in echo distinguisher 10, is performed. Upon receiving weather parameters generated in weather parameter estimator 9 and the weather echo region generated in weather echo region reconstruction unit 12 as inputs, weather parameter output unit 13 performs processing for providing a prescribed weather parameter in a region determined as the weather echo. Specifically, a weather echo in a range cell corresponding to the weather echo region determined by weather echo region reconstruction unit 12 is provided.

Operations by the signal processing apparatus (signal processor 5 which is a main part of the observation apparatus) according to the first embodiment will now be described with reference to FIGS. 2 to 4. Namely, the signal processing method according to the first embodiment will be described. The signal processing method according to the first embodiment is a signal processing method using a weather parameter found based on a reception signal of a reflected wave of pulsed undulation transmitted repeatedly into a space, a Doppler spectrum derived from the reception signal, and a topographic-echo-removed spectrum resulting from removal of a topographic echo from the Doppler spectrum.

Figure 2:
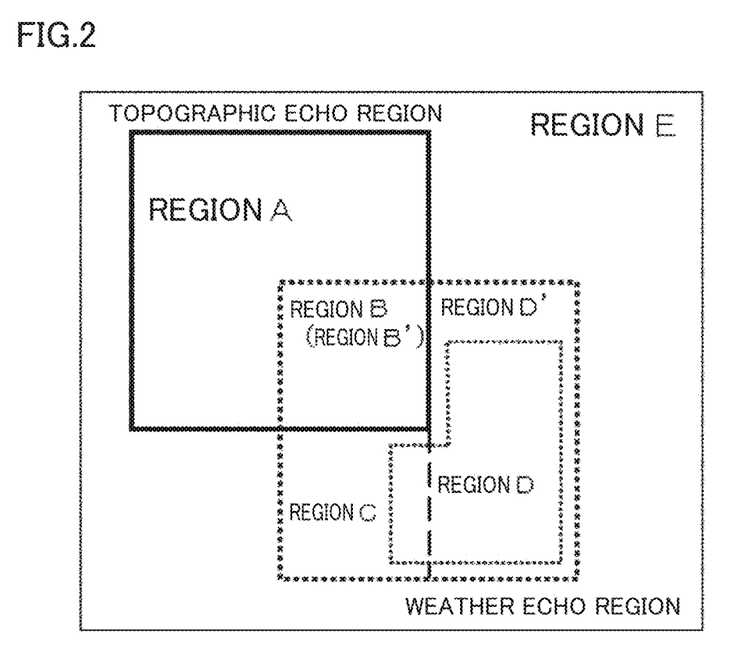
FIG. 2 is a schematic diagram showing an exemplary observation region of an observation apparatus to which the signal processing apparatus and a signal processing method according to first to third embodiments of the present invention are applied.
Figure 3:
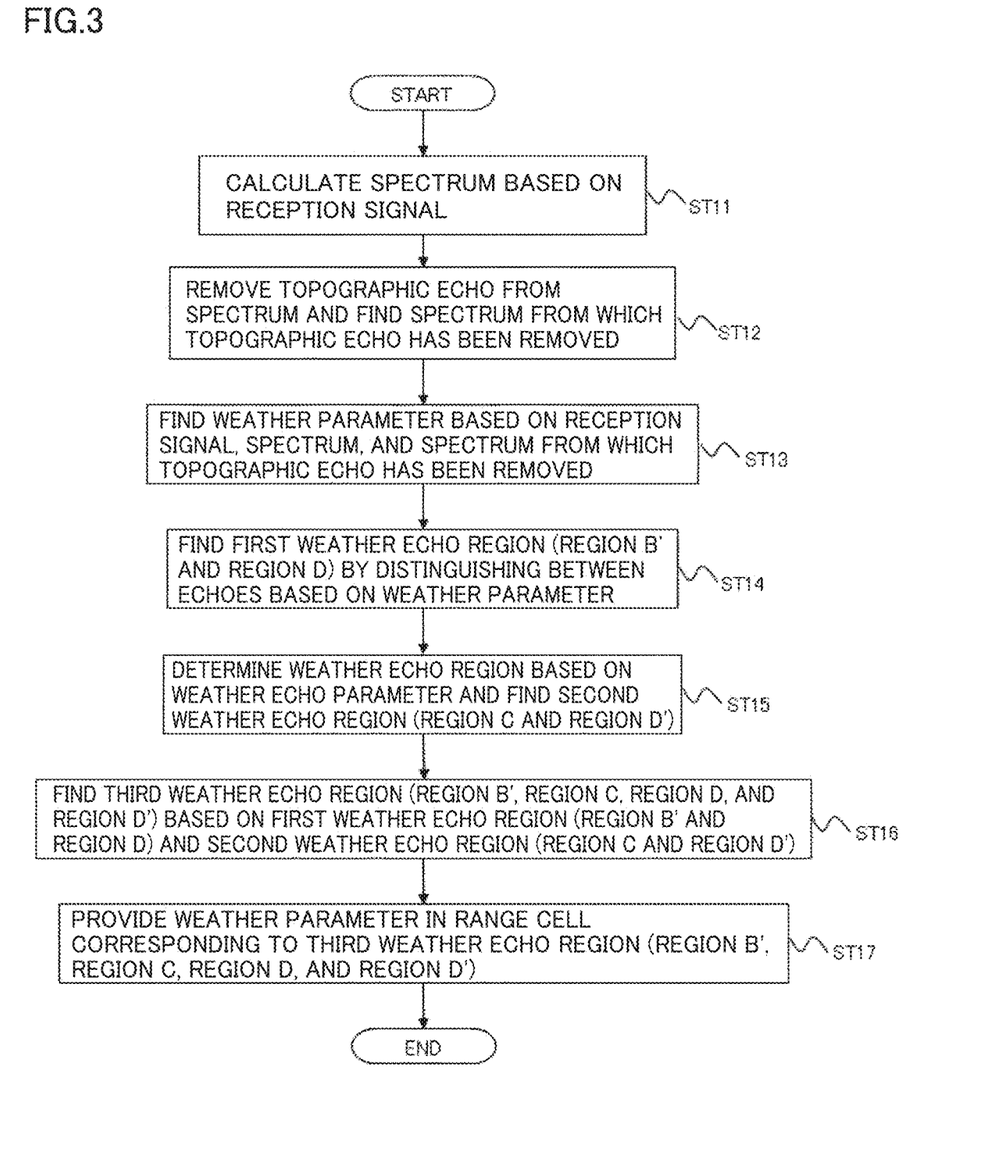
FIG. 3 is a flowchart of the signal processing method according to the first embodiment of the present invention.

FIG. 2 is a schematic diagram showing an exemplary observation region of an observation apparatus and showing a state of distribution of a topographic echo region and a weather echo region. In FIG. 2, a region A is a region where only a topographic echo is present. A region B is a region where a weather echo is superimposed on a topographic echo. A region B' is a region where there is only a weather echo as a result of topographic echo removal processing on region B. A region C is a zero-Doppler weather echo region. A region D is a region distinguished as a weather echo in echo distinction processing (an echo distinction step). A region D' is a region where there is only a weather echo (including no zero-Doppler weather echo). A region E is a region that includes neither of a weather echo and a topographic echo, or is a noise or undeterminable region. Regions A, B (B'), C, and D' do not have a portion in common (an overlapping portion). Specifically, region C does not include B (B'). Regions A, B (B'), and D do not include a portion in common (an overlapping portion) either.

In FIG. 2, region C+region D' represent a region determined as a weather echo in weather echo region determination processing (a weather echo region determination step), region A+region B represent an original topographic echo region, and region B'+region C+region D+region D' represent an original weather echo region. Though FIG. 2 illustrates region D as being contained in region C+region D', region D may contain region C+region D'.

The signal processing method according to the first embodiment (operations by the signal processing apparatus according to the first embodiment) will be described in detail with reference to the flowchart in FIG. 3. Only a step 14 (ST14) to a step 16 (ST16) may be defined as the signal processing method according to the first embodiment. In a spectrum calculation step denoted as a step 11 (ST11), spectrum calculator 7 calculates a (Doppler) spectrum by Fourier transform of a (time-series) reception signal for each range cell. Then, a topographic echo removal step denoted as a step 12 (ST12) is performed. In ST12, topographic echo remover 8 removes a topographic echo from the spectrum calculated in ST11 and generates a topographic-echo-removed spectrum.

A method of removing components over a prescribed spectral width with a zero Doppler velocity on a spectrum being defined as the center and thereafter carrying out linear interpolation across opposing ends of the removed components or a method of estimating a topographic echo component by fitting with a first Gaussian spectrum with a zero Doppler velocity being defined as the center, removing a component contained in the first Gaussian spectrum, thereafter fitting remaining spectral points with a second Gaussian spectrum, and substituting the removed spectral points with second Gaussian spectral points can be employed as a method of removing a topographic echo in ST12. Though a topographic echo is removed on a spectrum, a non-recursive low-frequency elliptic filter can also be applied to a reception signal on a time axis.

Weather parameter estimator 9 performs a step 13 (ST13) which is a weather parameter estimation step by using the (time-series) reception signal, the spectrum found in ST11, and the topographic-echo-removed spectrum found in ST12. For the weather parameter, not only strength (electric power) estimated as a spectral moment, a Doppler velocity, and a spectral width but also variability in phase of the reception signal in a prescribed space (a range and an azimuth), similarly variability in strength, variability in Doppler velocity, variability in spectral width, difference in strength (clutter suppression ratio; CSR) between before and after topographic echo removal processing, and in the case of dual polarization radar, variability in radar reflective factor difference, variability in phase difference between polarized waves, and variability in coefficient of correlation between polarized waves can be employed.

Strength (electric power) and the radar reflective factor are synonymously handled. Variability in the space is also called a texture parameter and calculated as in an expression (1) below. Table 1 shows exemplary representative weather parameters.

$$T(y_{i,j}) = \sqrt{\frac{\sum_{i}^{m}(y_{i,j} - y_{i-1,j})^2}{m}} \text{ or } \sqrt{\frac{\sum_{i}^{m}(y_{i,j} - \mu_{i,j})^2}{m}}, \mu_{i,j} = \frac{\sum_{i}^{m} y_{i,j}}{m} \quad (1)$$

In the expression (1), T represents variability, y represents an original parameter, i represents a number in a range direction, j represents a number in an azimuth direction, m represents the number of ranges (bins), and represents an average. Though variability in m spaces is calculated only in the range direction for reduction in amount of calculation, the number of spaces can be increased to a prescribed number also in the azimuth direction.

TABLE 1

| Weather Parameter | Topographic Echo | Weather Echo Other Than Zero Doppler | Weather Echo Zero Doppler |
|---|---|---|---|
| Signal Strength (Radar Reflection Factor) Z | High | Generally Low | Generally Low |
| Doppler Velocity V | Distributed Around 0 | Various | Distributed Around 0 |
| Spectral Width W | Narrow | Generally Wide | Generally Wide |
| Phase Variability T($\phi$) | Small | Large | Small |
| Signal Strength Variability T(Z) | Large | Small | Small |
| Doppler Velocity Variability T(V) | Small | Generally Large | Small |
| Spectral Width Variability T(W) | Small | Generally Large | Small |
| Variability T(Zdr) in Radar Reflection Factor Difference | Large | Small | Small |
| Variability T($\phi$dp) in Phase Difference Between Polarized Waves | Small | Large | Large |
| Variability T($\rho$hv) in Coefficient of Correlation Between Polarized Waves | Large | Various | Various |
| Difference in Signal Strength CSR (Clutter Suppression Ratio) Between Before and After Topographic Echo Removal Processing | Large | Small (None) | May Be Different |

Table 1 shows a behavior in an example where the weather parameter is a topographic echo, a behavior in an example where the weather parameter is a weather echo (other than zero Doppler), and a behavior in an example where the weather parameter is a weather echo (zero Doppler). The weather parameter can also include, for example, clutter phase alignment (CPA) described in NPL 1, in addition to the parameters in Table 1.

Then, in the echo distinction step denoted as step 14 (ST14), a first weather echo region is found based on a weather parameter different in behavior between the weather echo and the topographic echo, among the weather parameters. Specifically, echo distinguisher 10 uses the weather parameter found in ST13 to perform echo distinction processing to estimate the first weather echo region (region B' and region D in FIG. 2).

Figure 4:
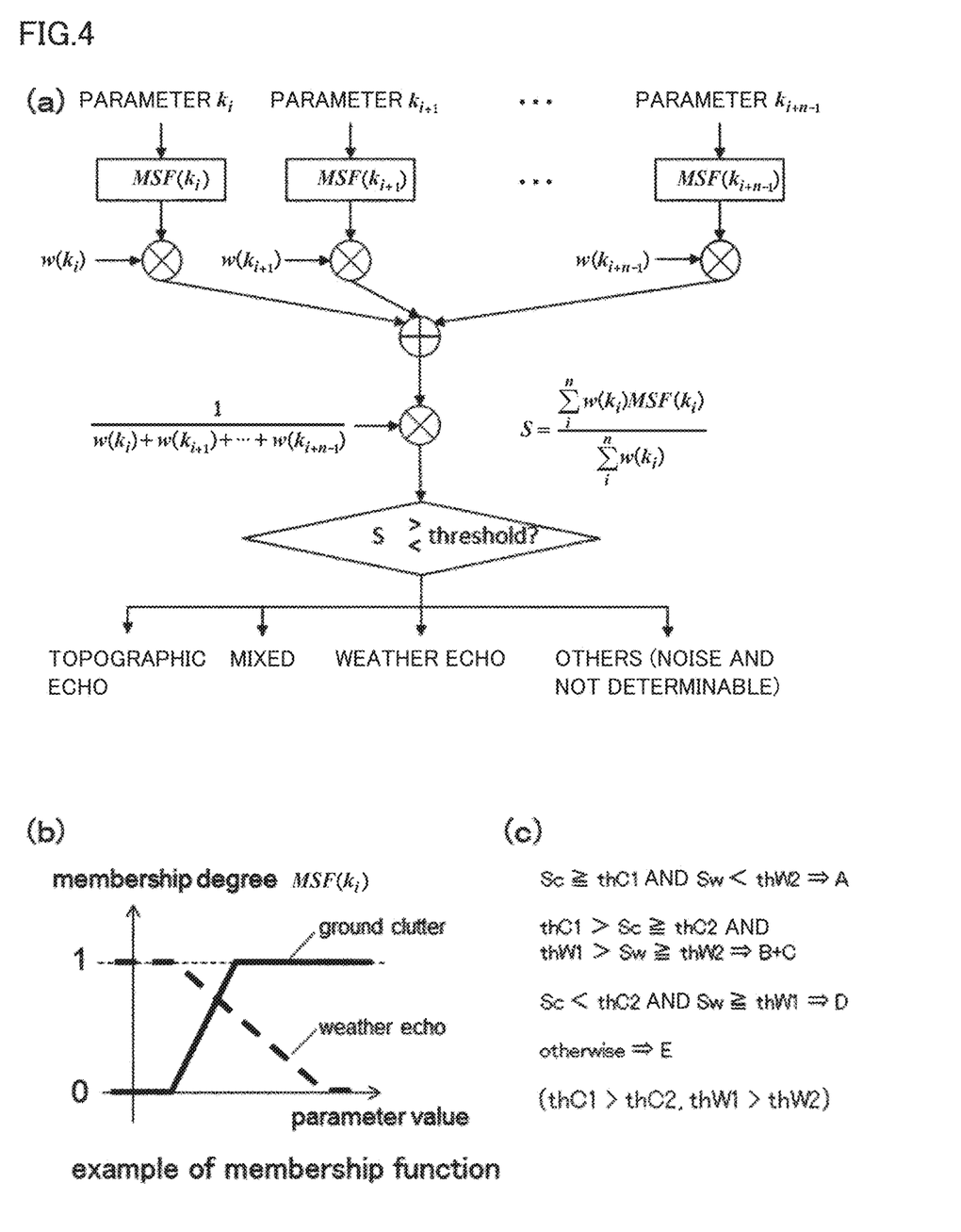
FIG. 4 is a schematic diagram showing exemplary echo distinction by the signal processing apparatus and the signal processing method according to the first to third embodiments of the present invention.

FIG. 4 shows exemplary echo distinction processing in ST14. In exemplary echo distinction processing in FIG. 4, at least one weather parameter is used to find a criterion value as a weather echo and a criterion value as a topographic echo. The criterion value and a prescribed threshold value are compared in magnitude with each other to determine whether the echo of the reception signal is the weather echo (region D) or the topographic echo (region A) or whether the echo of the reception signal belongs to a region where the weather echo is superimposed on the topographic echo, a weather echo region (region B+region C) where the Doppler velocity is distributed around zero, or otherwise (region E). In echo distinction processing using the weather parameter, region B and region C are similar to each other in property and it is often difficult to clearly distinguish between them. Therefore, combination of these regions is hereinafter referred to as a mixed region. The first weather echo region (region B' and region D) is obtained by integrating a region (region D) including only a weather echo and a region (region B') including only a weather echo as a result of application of topographic echo removal processing to the region (region B+region C) where the weather echo and the topographic echo are together present. Therefore, though the first weather echo region includes region C where there is no excessive suppression by topographic echo removal processing, for distinction from region C within a second weather echo region which will be described later, region C in the first weather echo region is not clearly shown.

FIG. 4 (a) is a block diagram of echo distinction processing. FIG. 4 (b) is a schematic diagram of a membership function used in echo distinction processing. FIG. 4 (c) shows exemplary determination. In FIG. 4 (a), a membership value $MSF(\kappa_i)$ is calculated by receiving n weather parameters from a parameter $\kappa_i$ to a parameter $\kappa_{i+n-1}$ as inputs and referring to the membership function (the membership function shown in FIG. 4 (b)) corresponding thereto. Then, a criterion value S (a criterion value Sw as the weather echo and a criterion value Sc as the topographic echo is calculated by adding results of multiplication by a weight coefficient $w(\kappa_i)$ corresponding to membership value MSF $(\kappa_i)$ and dividing a result of addition by the sum of weight coefficients. Thereafter, as in the example in FIG. 4 (c), determination is made by using a prescribed threshold value to obtain a result of echo distinction. Though FIG. 4 shows an example of echo distinction processing by using the membership function, for example, a determination method by a decision tree in which comparison with a prescribed threshold value is sequentially made for each weather parameter to distinguish between echoes or a determination method by support vector machine (SVM), a neural network, or machine learning such as deep learning can also be employed.

In a weather echo region determination step (echo region determination step) denoted as a step 15 (ST15), a second weather echo region is found based on a weather parameter among the weather parameters a behavior of which is not dependent on a Doppler velocity. Specifically, weather echo region determination unit 11 performs weather echo region determination step using the weather parameter found in ST13 to estimate the second weather echo region (region C and region D' in FIG. 2). In the weather echo region determination processing, processing as in ST14 can be used. The weather parameter used here is not dependent on a behavior of a Doppler velocity, that is, a parameter identical in behavior between a zero-Doppler weather echo and a weather echo other than that is used. In the example in Table 1, variability in signal strength or variability in radar reflective factor difference is employed.

In a weather echo region reconstruction step denoted as step 16 (ST16), a combined region of the first weather echo region and the second weather echo region is determined as the weather echo region. Specifically, a third weather echo region (region B', region C, region D, and region D' in FIG. 2) is calculated based on the logical sum of the first weather echo region found in ST14 and the second weather echo region found in ST15. In the first weather echo region in ST14, in order to reliably remove the topographic echo region from the weather echo region, determination is made based on a weather parameter that permits attenuation of the weather echo (similar in behavior to the topographic echo). Since only the weather echo region in the second weather echo region is extracted in ST15, it is difficult to extract a region where the weather echo and the topographic echo are superimposed on each other. Then, by integrating them, the original weather echo region containing the zero-Doppler region can be reproduced.

In step 16 (ST16), in calculation of the logical sum, the first weather echo region includes a range cell in zero-Doppler weather echo region C, although it may be suppressed by topographic echo removal processing. Therefore, a range cell in this region C overlaps with a range cell in region C contained in the second weather echo region. When a weather echo in the first weather echo, a topographic echo overlapping region, and a range cell of the second weather echo overlap with one another, a range cell of the second weather echo not affected by removal of the topographic echo is selected. Similarly, a range cell in region D within the first weather echo region and a range cell in the second weather echo region may overlap with each other. In this case, a range cell in the first weather echo region (region D) highly reliable as the weather echo because of being subjected to evaluation by comparison with the topographic echo is selected.

In a step 17 (ST17) which is a weather parameter output step, weather parameter output unit 13 provides a weather parameter (calculated in ST13) in a range cell corresponding to the third weather echo region (region B', region C, region D, and region D') which is the final weather echo region found in ST16. Preferably, in weather echo region determination unit 11 (ST15), at least one of variability in signal strength, variability in spectral width, variability in radar reflective factor difference, and variability in coefficient of correlation between polarized waves among the weather parameters can be used. Preferably, echo distinguisher 10 (ST14) can use at least one of a difference in signal strength between the Doppler spectrum and the topographic-echo-removed spectrum, signal strength, the spectral width, variability in phase, variability in signal strength, variability in spectral width, variability in radar reflective factor difference, and variability in phase difference between polarized waves among the weather parameters.

As set forth above, the signal processing apparatus and the signal processing method according to the first embodiment make up a final weather echo region by integrating a result of determination of the weather echo region obtained by determination high in capability to distinguish between the weather echo and the topographic echo and a result of determination as to only the weather echo, and hence can reconstruct the zero-Doppler weather echo attenuated in topographic echo removal processing and consequently can obtain a highly accurate weather parameter.

Second Embodiment

A signal processing apparatus and a signal processing method according to a second embodiment of the present invention will be described with reference to FIGS. 1, 2, 4, and 5. In particular, the signal processing method according to the second embodiment will be described with reference to FIG. 5. Description of a portion in common between the second embodiment and the first embodiment may not be provided. The same or corresponding elements in the drawings of the present application have the same reference characters allotted and detailed description thereof may not be provided. Though the logical sum of the first weather echo region and the second weather echo region is defined as the final (third) weather echo region in the signal processing apparatus and the signal processing method according to the first embodiment, a weather echo region in which attenuation of zero Doppler is mitigated can also be made up in a different form. A functional block configuration of the signal processing apparatus according to the second embodiment is shown in FIG. 1 as in the first embodiment. The second embodiment is different from the first embodiment in operations by echo distinguisher 10 and weather echo region reconstruction unit 12.

In the signal processing apparatus according to the second embodiment, echo distinguisher 10 finds (in the echo distinction step) as the first weather echo region as defined in the first embodiment, a first mixed region including a region where at least the weather echo and the topographic echo are together present. Preferably, echo distinguisher 10 finds (in the echo distinction step) the first mixed region and the first weather echo region other than the first mixed region where the weather echo is present. Weather echo region reconstruction unit 12 (the weather echo region reconstruction step) determines as a second mixed region, a region in the first mixed region other than an overlapping region where the first mixed region and the second weather echo region overlap with each other, determines as a common region, a portion in the overlapping region corresponding to the second weather echo region (consequently, a portion to be the weather echo region where a Doppler velocity is zero), and determines a combined region of the second mixed region and the common region as the final weather echo region. Preferably, weather echo region reconstruction unit 12 determines (in the weather echo region reconstruction step) as the final weather echo region, a region resulting from addition of "the first weather echo region other than the first mixed region where the weather echo is present" to the combined region of the second mixed region and the common region.

Figure 5:
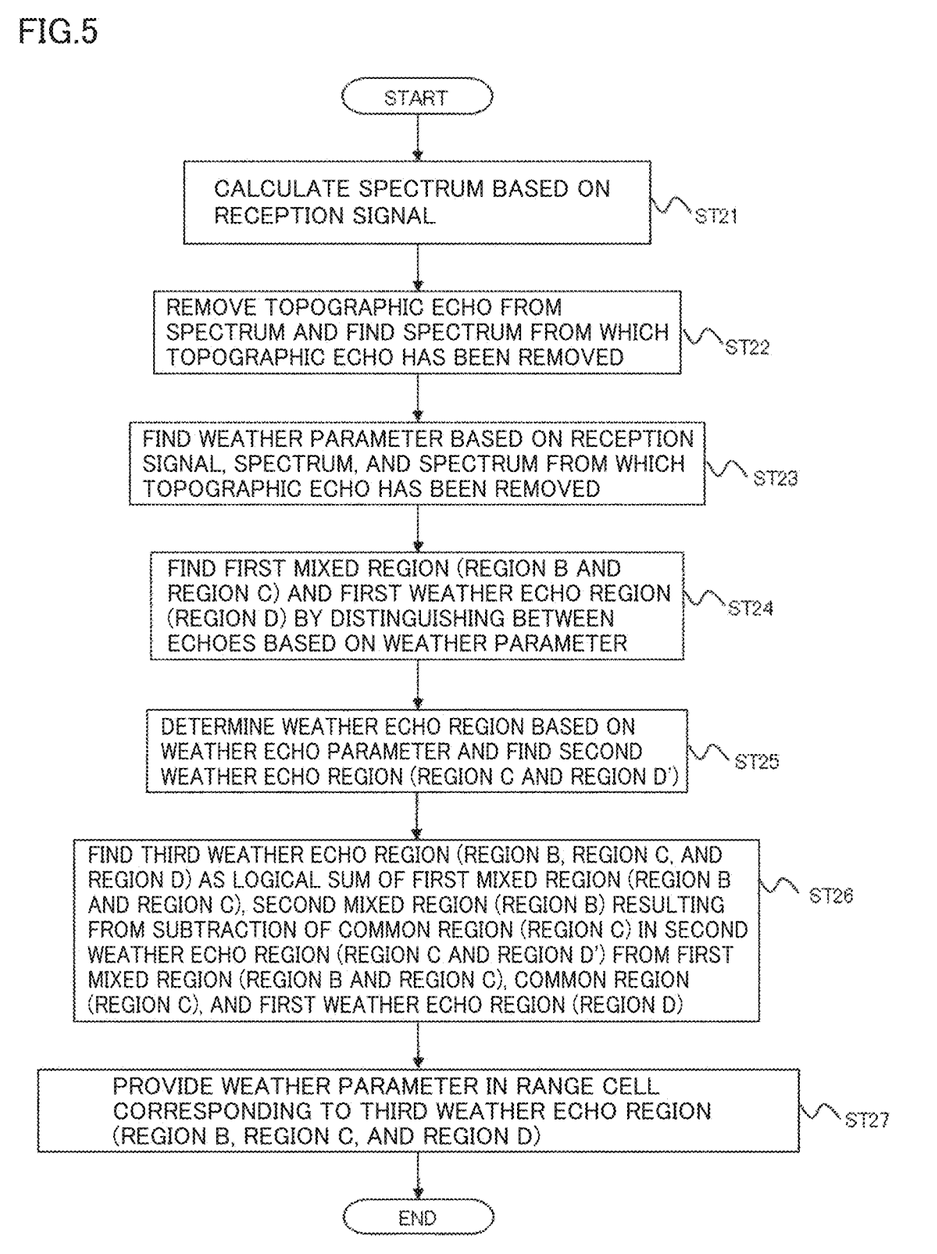
FIG. 5 is a flowchart of the signal processing method according to the second embodiment of the present invention.

The signal processing method according to the second embodiment (operations by the signal processing apparatus according to the second embodiment) will be described in detail with reference to the flowchart in FIG. 5. Only a step 24 (ST24) to a step 26 (ST26) may be defined as the signal processing method according to the second embodiment. In FIG. 5, a step 21 to a step 23 (ST21 to ST23) are processing similar to step 11 to step 13 (ST11 to ST13) shown in FIG. 3. In the first embodiment, in subsequent processing (ST14 in FIG. 3) by echo distinguisher 10, region D determined as including only the weather echo and region B' (though region B and region C are mixed regions before removal of the topographic echo, region C is attenuated and only region B' remains as a result of removal of the topographic echo) resulting from removal of the topographic echo from the region determined as the mixed region where the weather echo and the topographic echo are together present are integrated to define the first weather echo region (region B' and region D).

In the second embodiment, in step 24 (ST24) which is the echo distinction step, a weather parameter among the weather parameters which is different in behavior between the weather echo and the topographic echo is used to find the first mixed region including a region where at least the weather echo and the topographic echo are together present. Specifically, region D determined as including only the weather echo in ST24 is defined as the first weather echo region and region B and region C that are the mixed regions before topographic echo removal processing are defined as the first mixed region. Step 25 (ST25) of thereafter finding second weather echo regions C and D' is similar to ST15 in FIG. 3.

Then, step 26 (ST26) which is the weather echo region reconstruction step is performed. In ST26, a region in the first mixed region other than the overlapping region where the first mixed region and the second weather echo region overlap with each other is determined as the second mixed region, a portion in the overlapping region corresponding to the second weather echo region is determined as the common region, and a combined region of the second mixed region and the common region is determined as the weather echo region. Specifically, weather echo region reconstruction unit 12 calculates the logical sum of the first mixed region (region B and region C) obtained in ST24, the second mixed region (region B) generated by subtracting region C which is the region in common to the second weather echo region (region C and region D') obtained in ST25 from the first mixed region (region B and region C), region C which is the common region, and first weather echo region D obtained in ST24 to generate a third weather echo region (region B, region C, and region D) which is the final weather echo region. Finally, the value of the second mixed region is substituted with a value resulting from removal of the topographic echo (region B becomes region B' as a result of this operation), and a weather parameter (calculated in ST23) in a range cell corresponding to the third weather echo region (region B', region C, and region D) found in ST26 is provided as output (ST27).

A difference between the third weather echo region (region B', region C, and region D) obtained in the signal processing apparatus and the signal processing method according to the second embodiment and the third weather echo region (region B', region C, region D, and region D') obtained in the signal processing apparatus and the signal processing method according to the first embodiment resides in whether or not region D' is included. Region D' is a region extracted based on spatial variability (texture) of the weather parameter, and advantageously less likely to be affected by zero Doppler. Evaluation based on presence of a property as the weather echo, however, is merely conducted, and the possibility of being the topographic echo is not excluded. Therefore, the possibility of introduction of a topographic echo or a signal such as noise is not zero. Therefore, when a signal-to-noise power ratio of the reception signal is relatively low or under a condition that a difference between the weather echo and the topographic echo is less likely to be exhibited, the third weather echo region (region B', region C, and region D) obtained in the signal processing apparatus and the signal processing method according to the second embodiment may be high in capability to sense a weather echo.

As set forth above, the signal processing apparatus and the signal processing method according to the second embodiment make up the final weather echo region by clearly identifying only the weather echo region with zero Doppler, and hence it can avoid attenuation of the weather echo in the zero-Doppler region by topographic echo removal processing and consequently can obtain a highly accurate weather parameter. Since the signal processing apparatus and the signal processing method according to the second embodiment make up the final weather echo region based on the weather echo region low in possibility of introduction of the topographic echo, they can achieve improved capability to sense the weather echo region and consequently can obtain a highly accurate weather parameter.

Third Embodiment

Figure 6:
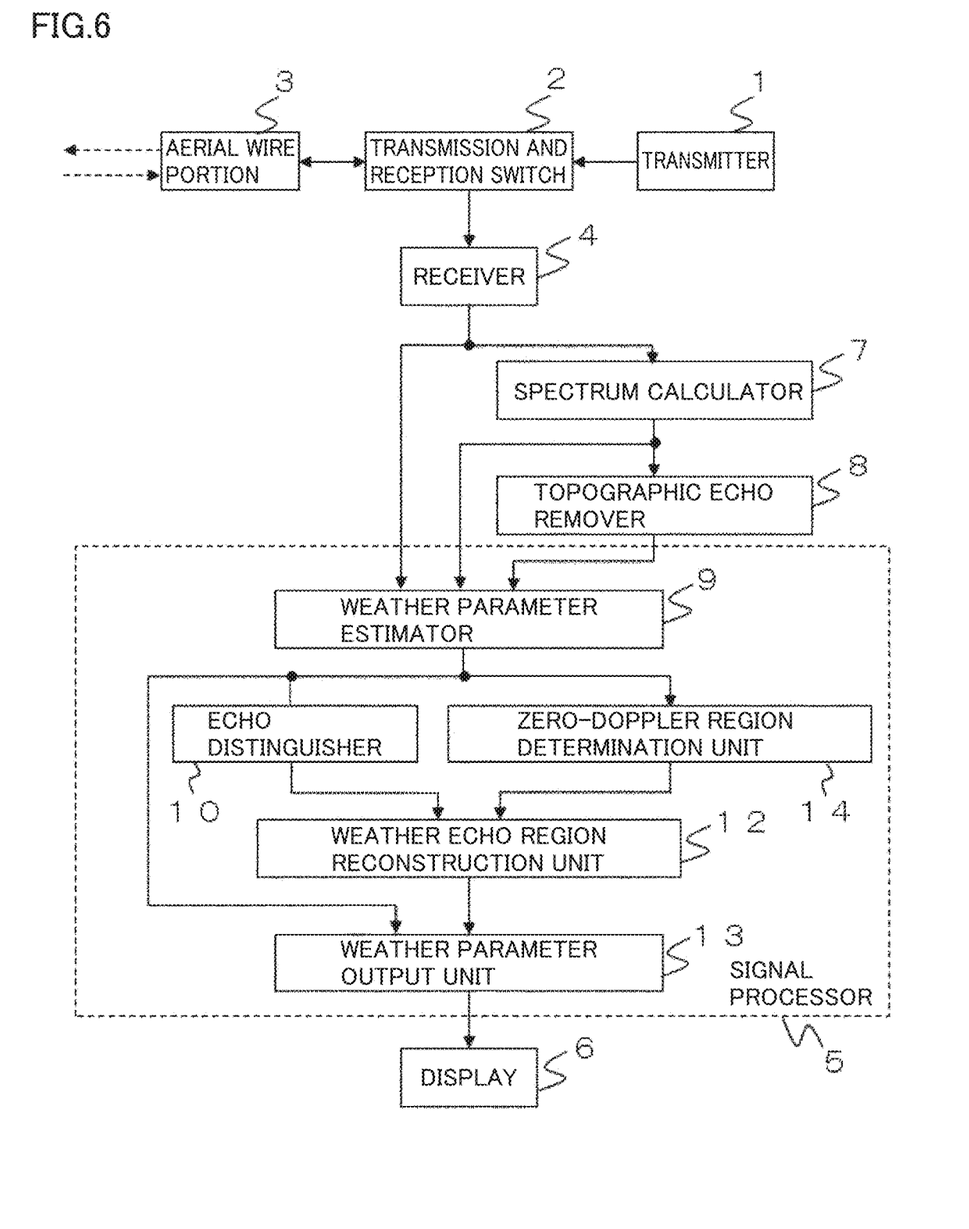
FIG. 6 is a functional block diagram of the signal processing apparatus according to the third embodiment of the present invention.

A signal processing apparatus and a signal processing method according to a third embodiment of the present invention will be described with reference to FIGS. 2, 4, 6, and 7. In particular, the signal processing method according to the third embodiment will be described with reference to FIG. 7. FIG. 6 is a functional block diagram of a weather radar apparatus (an observation apparatus or a measurement apparatus) to which the signal processing apparatus according to the third embodiment is applied. The present application can be carried out also according to a configuration of a functional block different from that in FIG. 3. In other words, the configuration shown in FIG. 3 is an exemplary block configuration. Description of a portion in common between the third embodiment and the first and second embodiments may not be provided. The same or corresponding elements in the drawings of the present application have the same reference characters allotted and detailed description thereof may not be provided. In the second embodiment, a portion in common between a region determined as the mixed region in echo distinction processing and a region determined as the weather echo region based on a property of spatial variation (texture) of a weather echo parameter is consequently extracted as a zero-Doppler region. In the third embodiment, a zero-Doppler region is directly obtained by using a Doppler velocity as the weather parameter.

Figure 7:
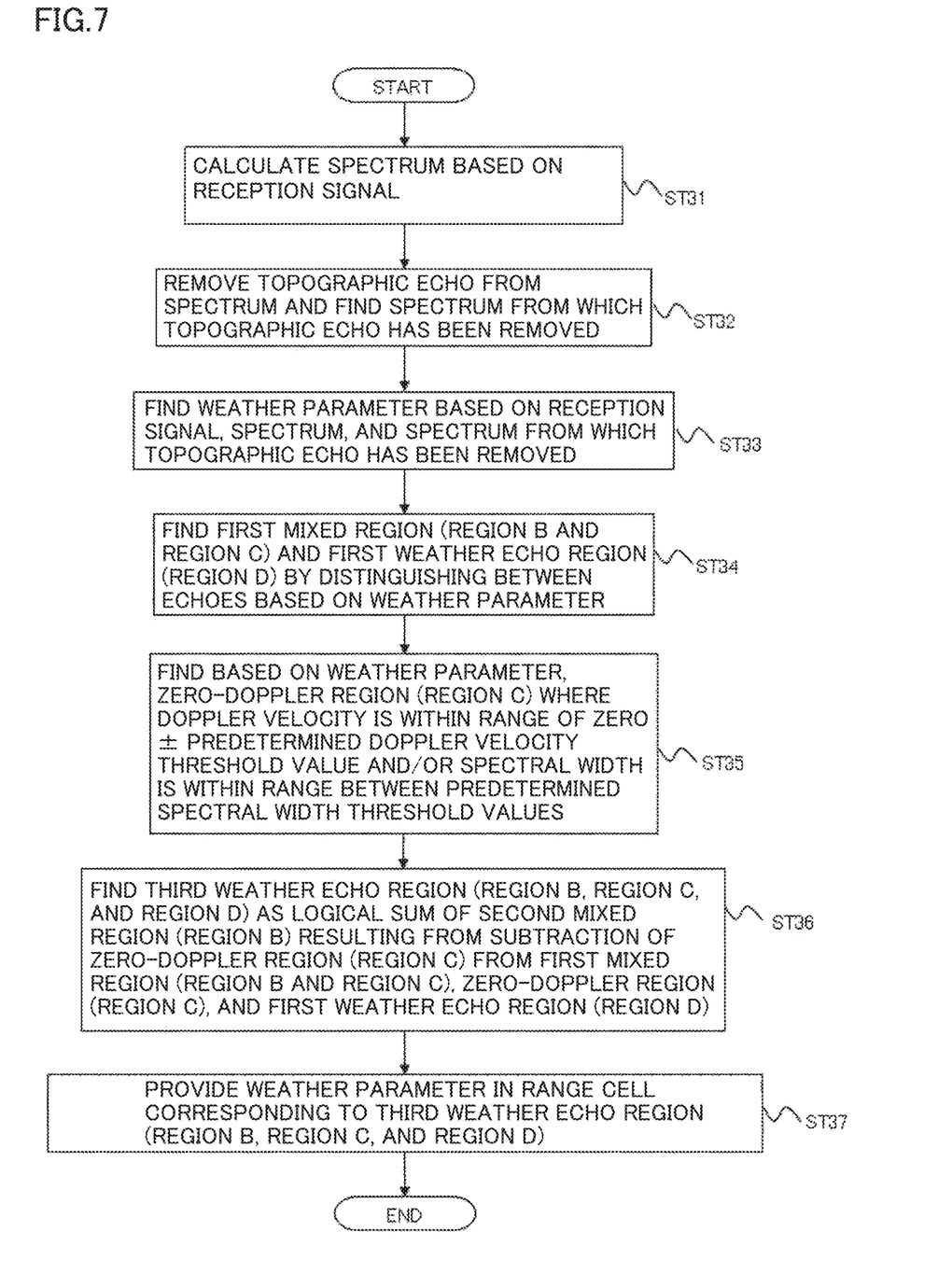
FIG. 7 is a flowchart of the signal processing method according to the third embodiment of the present invention.

The third embodiment is different from the second embodiment in operations by echo region determination unit 11 (weather echo region determination unit 11) and weather echo region reconstruction unit 12, and includes an echo region determination unit 14 (a zero-Doppler region determination unit 14) instead of echo region determination unit 11 (weather echo region determination unit 11). In FIG. 7, zero-Doppler region determination unit 14 (echo region determination unit 14) finds a weather echo region where a Doppler velocity is zero based on the weather parameter. Specifically, at least one of a region within a range between predetermined Doppler velocity threshold values with the Doppler velocity of zero being defined as the center and a region where a spectral width is within a range between prescribed spectral width threshold values is found as the weather echo region where a Doppler velocity is zero. Weather echo region reconstruction unit 12 determines the weather echo region based on the first weather echo region (strictly speaking, the first mixed region, or the first mixed region and the first weather echo region other than the first mixed region where the weather echo is present) and the weather echo region where the Doppler velocity is zero.

Zero-Doppler region determination unit 14 shown in FIG. 6 performs processing for identifying a range cell where a Doppler velocity is zero, based on a Doppler velocity among weather parameters generated in weather parameter estimator 9. The zero-Doppler region is produced also in a region where a Doppler velocity exceeds a Nyquist velocity, turns back, and again has a value around zero. Therefore, the Doppler velocity here is defined as a Doppler velocity yet to be subjected to turn-back correction. The signal processing method according to the third embodiment (operations by the signal processing apparatus according to the third embodiment) will be described with reference to FIGS. 6 and 7.

The signal processing method according to the third embodiment (operations by the signal processing apparatus according to the third embodiment) will be described in detail with reference to the flowchart in FIG. 7. Only a step 34 (ST34) to a step 36 (ST36) may be defined as the signal processing method according to the third embodiment. In FIG. 7, a step 31 to step 34 (ST31 to ST34) are processing similar to step 21 to step 24 (ST21 to ST24) shown in FIG. 5. In a zero-Doppler region determination step (the echo region determination step) denoted as a step 35 (ST35), the weather echo region where a Doppler velocity is zero is found based on the weather parameter. Specifically, a region where a Doppler velocity is within a range of zero±a prescribed Doppler velocity threshold value and/or a spectral width is within a range between prescribed spectral width threshold values is determined as zero-Doppler region C based on the weather parameter obtained in ST33.

In the weather echo region reconstruction step denoted as step 36 (ST36), a region in the first mixed region other than an overlapping region where the first mixed region and the weather echo region where a Doppler velocity is zero overlap with each other is determined as the second mixed region, the weather echo region where a Doppler velocity is zero is determined as the common region, and a combined region of the second mixed region and the common region is determined as the final weather echo region. Specifically, the third weather echo region (region B, region C, and region D) which is the final weather echo region is found as the logical sum of the second mixed region (region B) found by subtracting the zero-Doppler region (region C) obtained in ST35 from the first mixed region (region B and region C) obtained in ST34, the zero-Doppler region (region C), and the first weather echo region (region D) obtained in ST34. ST37 is similar to ST27 in FIG. 5. A value of the range cell in region B is substituted with a value resulting from removal of the topographic echo (to be region B').

The signal processing apparatus and the signal processing method according to the third embodiment can directly identify a section around the zero Doppler velocity and hence achieve accuracy in estimation of the zero-Doppler region. As set forth above, since the signal processing apparatus and the signal processing method according to the third embodiment directly identify the zero-Doppler region based on the Doppler velocity, they can achieve improved accuracy in estimation of the zero-Doppler region and consequently can obtain a highly accurate weather parameter.

Figure 8:
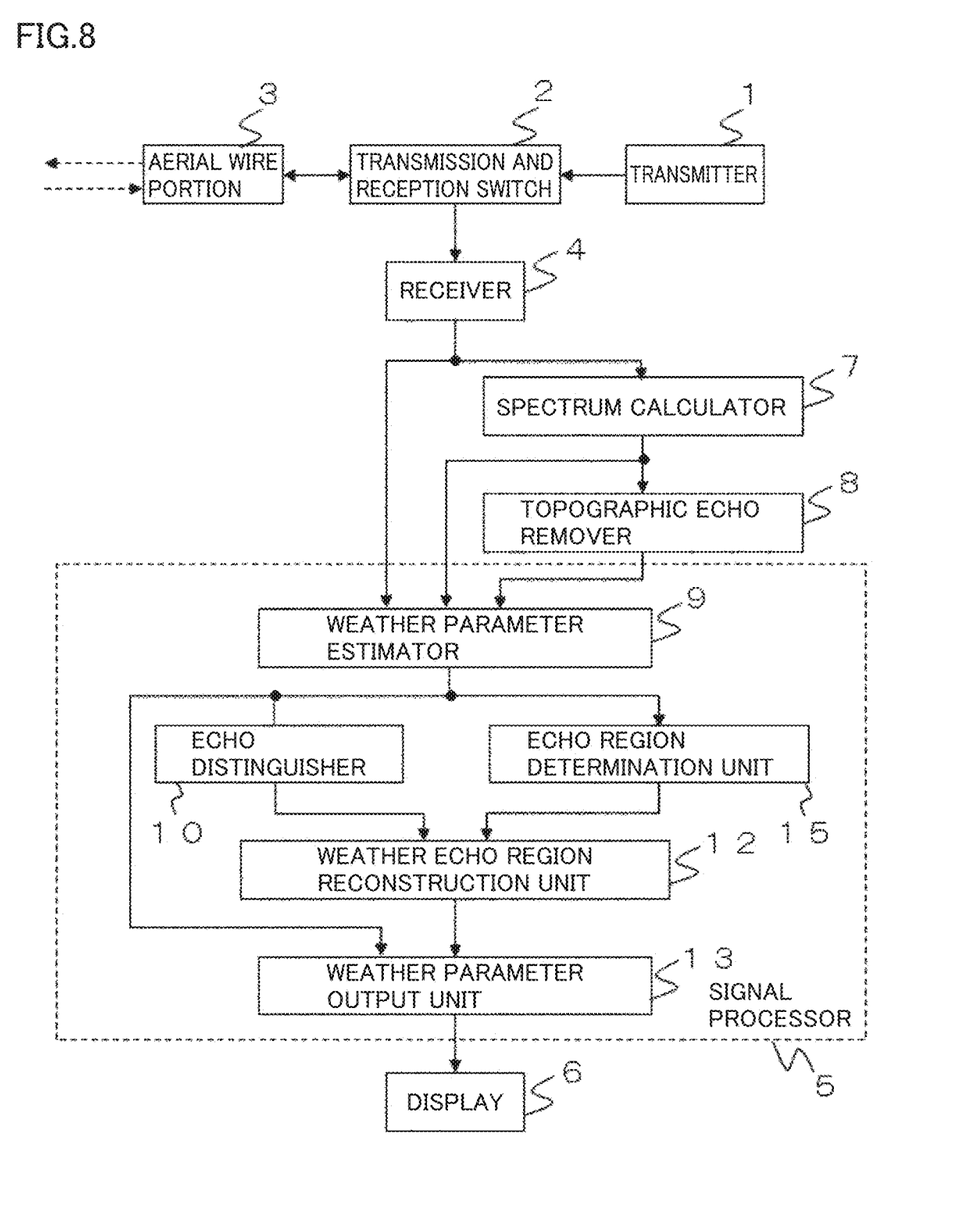
FIG. 8 is a functional block diagram of the signal processing apparatus according to each of the first to third embodiments of the present invention.

FIG. 8 is a functional block diagram of the weather radar apparatus (the observation apparatus or the measurement apparatus) to which the signal processing apparatus according to each of the first to third embodiments is applied. The present application can be carried out also according to a configuration of a functional block different from that in FIG. 8. In other words, the configuration shown in FIG. 8 is an exemplary block configuration. In FIG. 8, an echo region determination unit 15 performs a function of at least one of weather echo region determination unit 11 and zero-Doppler region determination unit 14.

As shown in FIG. 8, the signal processing apparatus according to each of the first to third embodiments can be concluded as including weather parameter estimator 9 that finds a weather parameter based on a reception signal of a reflected wave of pulsed undulation repeatedly transmitted into a space, a Doppler spectrum derived from the reception signal, and a topographic-echo-removed spectrum resulting from removal of a topographic echo from the Doppler spectrum, echo distinguisher 10 that finds a first weather echo region based on a weather parameter among weather parameters that is different in behavior between a weather echo and the topographic echo, echo region determination unit 11 (weather echo region determination unit 11) that finds a second weather echo region based on a weather parameter among the weather parameters a behavior of which is not dependent on a Doppler velocity or echo region determination unit 14 (zero-Doppler region determination unit 14) that finds a weather echo region where a Doppler velocity is zero based on the weather parameter, weather echo region reconstruction unit 12 that determines a weather echo region (a third weather echo region) based on the first weather echo region and the second weather echo region or based on the first weather echo region and the weather echo region where a Doppler velocity is zero, and weather parameter output unit 13 that provides a weather parameter in a range cell corresponding to the weather echo region (third weather echo region) determined by weather echo region reconstruction unit 12.

The signal processing method according to each of the first to third embodiments can be concluded as including an echo distinction step of finding a first weather echo region based on a weather parameter among weather parameters that is different in behavior between a weather echo and a topographic echo, an echo region determination step (a weather echo region determination step) of finding a second weather echo region based on a weather parameter among the weather parameters a behavior of which is not dependent on a Doppler velocity or an echo region determination step (a zero-Doppler region determination step) of finding a weather echo region where a Doppler velocity is zero based on the weather parameter, and a weather echo region reconstruction step of determining a weather echo region (a third weather echo region) based on the first weather echo region and the second weather echo region or based on the first weather echo region and the weather echo region where a Doppler velocity is zero.

The signal processing apparatus and the signal processing method according to each of the first to third embodiments use a weather parameter derived from a reception signal to make distinction as to whether a range cell of interest is a weather echo or a topographic echo and reconstruct a weather echo not to perform topographic echo removal processing onto a weather echo region having zero Doppler, and hence they can mitigate attenuation of the weather echo and can highly accurately estimate a weather parameter.

REFERENCE SIGNS LIST

1 transmitter; 2 transmission and reception switch; 3 aerial wire portion (antenna portion, undulation emitter and accepter); 4 receiver; 5 signal processor; 6 display; 7 spectrum calculator; 8 topographic echo remover; 9 weather parameter estimator; 10 echo distinguisher; 11 weather echo region determination unit (echo region determination unit); 12 weather echo region reconstruction unit; 13 weather parameter output unit; 14 zero-Doppler region determination unit (echo region determination unit); 15 echo region determination unit

The invention claimed is:

1. A signal processing apparatus comprising:
a signal processor configured to
find a weather parameter based on a reception signal of a reflected wave of a pulsed transmission wave repeatedly transmitted into a space, a Doppler spectrum derived from the reception signal, and a topographic-echo-removed spectrum resulting from removal of a topographic echo from the Doppler spectrum;
find a first weather echo region based on a weather parameter among weather parameters that is different in behavior between a weather echo and the topographic echo;
find a second weather echo region based on a weather parameter among the weather parameters a behavior of which is not dependent on a Doppler velocity;
determine a weather echo region based on a logical sum of the first weather echo region with the second weather echo region;
provide the weather parameter in a range cell corresponding to the weather echo region determined by the signal processor to reconstruct the weather echo region; and
cause a display to display at least one of the weather parameter and the reconstructed weather echo region.

2. The signal processing apparatus according to claim 1, wherein the signal processor is further configured to
find, as the first weather echo region, a first mixed region including a region where at least the weather echo and the topographic echo are together present,
determine, as a second mixed region, a region other than an overlapping region in the first mixed region where the first mixed region and the second weather echo region overlap with each other,
determine, as a common region, a portion in the overlapping region that corresponds to the second weather echo region,
determine, as the weather echo region, a combined region of the second mixed region and the common region, and
substitute a value of the second mixed region with a value resulting from removal of the topographic echo.

3. A signal processing apparatus comprising:
a signal processor configured to
find a weather parameter based on a reception signal of a reflected wave of a pulsed transmission wave repeatedly transmitted into a space, a Doppler spectrum derived from the reception signal, and a topographic-echo-removed spectrum resulting from removal of a topographic echo from the Doppler spectrum;
find a first weather echo region based on a weather parameter among weather parameters that is different in behavior between a weather echo and the topographic echo;
find a second weather echo region based on a weather parameter among the weather parameters a behavior of which is not dependent on a Doppler velocity;
determine a weather echo region based on the first weather echo region and the second weather echo region;
provide the weather parameter in a range cell corresponding to the weather echo region determined by the signal processor to reconstruct the weather echo region;
find, as the first weather echo region, a first mixed region including a region where at least the weather echo and the topographic echo are together present;
determine, as a second mixed region, a region other than an overlapping region in the first mixed region where the first mixed region and the second weather echo region overlap with each other;
determine, as a common region, a portion in the overlapping region that corresponds to the second weather echo region;
determine, as the weather echo region, a combined region of the second mixed region and the common region; and
substitute a value of the second mixed region with a value resulting from removal of the topographic echo,
wherein among the weather parameters, the signal processor is configured to use at least one of variability in signal strength, variability in spectral width, variability in radar reflective factor difference, and variability in coefficient of correlation between polarized waves.

4. A signal processing apparatus comprising:
a signal processor configured to
find a weather parameter based on a reception signal of a reflected wave of pulsed undulation repeatedly transmitted into a space, a Doppler spectrum derived from the reception signal, and a topographic-echo-removed spectrum resulting from removal of a topographic echo from the Doppler spectrum;

find a first weather echo region based on a weather parameter among weather parameters that is different in behavior between a weather echo and the topographic echo;

find a weather echo region where a Doppler velocity is zero based on the weather parameter among the weather parameters;

determine a weather echo region based on a logical sum of the first weather echo region with the weather echo region where the Doppler velocity is zero;

provide the weather parameter in a range cell corresponding to the weather echo region determined by the signal processor reconstruct the weather echo region; and cause a display to display at least one of the weather parameter and the reconstructed weather echo region, wherein the signal processor is further configured to find, as the first weather echo region, a first mixed region including a region where at least the weather echo and the topographic echo are together present, determine, as a second mixed region, a region other than an overlapping region in the first mixed region where the first mixed region and the weather echo region where the Doppler velocity is zero overlap with each other, determine the weather echo region where the Doppler velocity is zero as a common region, determine a combined region of the second mixed region and the common region as the weather echo region, and substitute a value of the second mixed region with a value resulting from removal of the topographic echo.

5. The signal processing apparatus according to claim 4, wherein the signal processor is further configured to find, as the weather echo region where the Doppler velocity is zero, at least one of a region within a range between predetermined Doppler velocity threshold values with the Doppler velocity of zero being defined as a center and a region where a spectral width is within a range between prescribed spectral width threshold values.

6. A signal processing apparatus comprising:

a signal processor configured to find a weather parameter based on a reception signal of a reflected wave of a pulsed transmission wave repeatedly transmitted into a space, a Doppler spectrum derived from the reception signal, and a topographic-echo-removed spectrum resulting from removal of a topographic echo from the Doppler spectrum;

find a first weather echo region based on a weather parameter among weather parameters that is different in behavior between a weather echo and the topographic echo;

find a second weather echo region based on a weather parameter among the weather parameters a behavior of which is not dependent on a Doppler velocity;

determine a weather echo region based on the first weather echo region and the second weather echo region; and provide the weather parameter in a range cell corresponding to the weather echo region determined by the signal processor to reconstruct the weather echo region, wherein among the weather parameters, the signal processor is configured to use a signal strength difference between the Doppler spectrum and the topographic-echo-removed spectrum, and at least one of signal strength, a spectral width, variability in phase, variability in signal strength, variability in spectral width, variability in radar reflective factor difference, and variability in phase difference between polarized waves.

7. A signal processing method using a weather parameter found based on a reception signal of a reflected wave of a pulsed transmission wave repeatedly transmitted into a space, a Doppler spectrum derived from the reception signal, and a topographic-echo-removed spectrum resulting from removal of a topographic echo from the Doppler spectrum, the signal processing method comprising:

distinguishing an echo by finding a first weather echo region based on a weather parameter among weather parameters that is different in behavior between a weather echo and the topographic echo;

determining an echo region by finding a second weather echo region based on a weather parameter among the weather parameters a behavior of which is not dependent on a Doppler velocity;

reconstructing a weather echo region by determining as a weather echo region, a combined region based on a logical sum of the first weather echo region with the second weather echo region; and causing a display to display the reconstructed weather echo region.

8. A signal processing method using a weather parameter found based on a reception signal of a reflected wave of pulsed undulation repeatedly transmitted into a space, a Doppler spectrum derived from the reception signal, and a topographic-echo-removed spectrum resulting from removal of a topographic echo from the Doppler spectrum, the signal processing method comprising:

distinguishing an echo by finding a first mixed region including a region where at least a weather echo and the topographic echo are together present based on a weather parameter among weather parameters that is different in behavior between the weather echo and the topographic echo;

determining an echo region by finding a second weather echo region based on a weather parameter among the weather parameters, a behavior of which is not dependent on a Doppler velocity;

reconstructing a weather echo region by determining as a second mixed region, a region other than an overlapping region in the first mixed region where the first mixed region and the second weather echo region overlap with each other, determining as a common region, a portion in the overlapping region that corresponds to the second weather echo region, determining a combined region based on a logical sum of the second mixed region with the common region as a weather echo region, and substituting a value of the second mixed region with a value resulting from removal of the topographic echo; and causing a display to display the reconstructed the weather echo region.

9. The signal processing method according to claim 8, wherein distinguishing an echo includes finding a first mixed region includes finding a first weather echo region where a weather echo is present other than the first mixed region, and reconstructing a weather echo region includes determining a region resulting from addition of the first weather echo region to the combined region of the second mixed region and the common region as the weather echo region.

10. A signal processing method using a weather parameter found based on a reception signal of a reflected wave of a pulsed transmission wave repeatedly transmitted into a space, a Doppler spectrum derived from the reception signal, and a topographic-echo-removed spectrum resulting from removal of a topographic echo from the Doppler spectrum, the signal processing method comprising:
   distinguishing an echo by finding a first weather echo region based on a weather parameter among weather parameters that is different in behavior between a weather echo and the topographic echo;
   determining an echo region by finding a second weather echo region based on a weather parameter among the weather parameters a behavior of which is not dependent on a Doppler velocity; and
   reconstructing a weather echo region by determining as a weather echo region, a combined region of the first weather echo region and the second weather echo region,
   wherein determining the echo region includes using, among the weather parameters, at least one of variability in signal strength, variability in spectral width, variability in radar reflective factor difference, and variability in coefficient of correlation between polarized waves.

11. A signal processing method using a weather parameter found based on a reception signal of a reflected wave of pulsed undulation repeatedly transmitted into a space, a Doppler spectrum derived from the reception signal, and a topographic-echo-removed spectrum resulting from removal of a topographic echo from the Doppler spectrum, the signal processing method comprising:
   distinguishing an echo by finding a first mixed region including a region where at least a weather echo and the topographic echo are together present based on a weather parameter among weather parameters that is different in behavior between the weather echo and the topographic echo;
   determining an echo region by finding a weather echo region where a Doppler velocity is zero based on the weather parameter;
   reconstructing a weather echo region by determining as a second mixed region, a region other than an overlapping region in the first mixed region where the first mixed region and the weather echo region where the Doppler velocity is zero overlap with each other, determining the weather echo region where the Doppler velocity is zero as a common region, determining a combined region based on a logical sum of the second mixed region with the common region as the weather echo region, and substituting a value of the second mixed region with a value resulting from removal of the topographic echo; and
   causing a display to display the reconstructed weather echo region.

12. The signal processing method according to claim 11, wherein
   distinguishing the echo includes finding a first weather echo region where a weather echo is present other than the first mixed region, and
   reconstructing the weather echo region includes determining a region resulting from addition of the first weather echo region to the combined region of the second mixed region and the common region as the weather echo region.

13. The signal processing method according to claim 11, wherein determining the echo region includes finding at least one of a region within a range between predetermined Doppler velocity threshold values with the Doppler velocity of zero being defined as a center and a region where a spectral width is within a range between prescribed spectral width threshold values as the weather echo region where the Doppler velocity is zero.

14. A signal processing method using a weather parameter found based on a reception signal of a reflected wave of a pulsed transmission wave repeatedly transmitted into a space, a Doppler spectrum derived from the reception signal, and a topographic-echo-removed spectrum resulting from removal of a topographic echo from the Doppler spectrum, the signal processing method comprising:
   distinguishing an echo by finding a first weather echo region based on a weather parameter among weather parameters that is different in behavior between a weather echo and the topographic echo;
   determining an echo region by finding a second weather echo region based on a weather parameter among the weather parameters a behavior of which is not dependent on a Doppler velocity; and
   reconstructing a weather echo region by determining as a weather echo region, a combined region of the first weather echo region and the second weather echo region,
   wherein distinguishing the echo includes using among the weather parameters, a signal strength difference between the Doppler spectrum and the topographic-echo-removed spectrum and at least one of signal strength, a spectral width, variability in phase, variability in signal strength, variability in spectral width, variability in radar reflective factor difference, and variability in phase difference between polarized waves.

15. The signal processing apparatus according to claim 5, wherein the signal processor is further configured to linearly interpolate to fill in missing values in the topographic-echo-removed spectrum after removal of the topographical echo.

16. The signal processing apparatus according to claim 5, wherein the signal processor is further configured to fill in missing values in the topographical-echo-removed spectrum after removal of the topographical echo using Gaussian spectral fitting.

17. The signal processing method according to claim 8, further comprising linearly interpolating to fill in missing values in the topographic-echo-removed spectrum after removal of the topographical echo.

18. The signal processing method according to claim 8, further comprising filling in missing values in the topographical-echo-removed spectrum after removal of the topographical echo using Gaussian spectral fitting.

19. The signal processing method according to claim 11, further comprising linearly interpolating to fill in missing values in the topographic-echo-removed spectrum after removal of the topographical echo.

20. The signal processing method according to claim 11, further comprising filling in missing values in the topographical-echo-removed spectrum after removal of the topographical echo using Gaussian spectral fitting.

* * * * *